US007032235B2

(12) United States Patent
Pelkey et al.

(10) Patent No.: US 7,032,235 B2
(45) Date of Patent: Apr. 18, 2006

(54) RECASTING DVB VIDEO SYSTEM TO RECAST DIGITAL BROADCASTS

(75) Inventors: Gary L. Pelkey, Woodstock, GA (US); David M. Placek, Duluth, GA (US)

(73) Assignee: Wegener Communications, Inc., Duluth, GA (US)

( * ) Notice: Subject to any disclaimer, the term of this patent is extended or adjusted under 35 U.S.C. 154(b) by 267 days.

(21) Appl. No.: 10/387,976

(22) Filed: Mar. 12, 2003

(65) Prior Publication Data
US 2004/0181810 A1 Sep. 16, 2004

(51) Int. Cl.
H04N 7/025 (2006.01)
H04N 7/10 (2006.01)

(52) U.S. Cl. .................. 725/36; 725/116; 725/146
(58) Field of Classification Search ............ 725/32–36, 725/63–68, 114–120, 138, 144–147
See application file for complete search history.

(56) References Cited

U.S. PATENT DOCUMENTS

| 4,985,895 | A | 1/1991 | Pelkey ...................... 371/37.7 |
|---|---|---|---|
| 5,019,910 | A | 5/1991 | Filmer ......................... 358/188 |
| 5,404,505 | A | 4/1995 | Levinson .................... 395/600 |
| 5,550,576 | A | 8/1996 | Klosterman .................... 348/6 |
| 5,684,525 | A | 11/1997 | Klosterman ................. 348/12 |
| 5,694,334 | A | 12/1997 | Donahue et al. ........ 364/514 R |
| 5,764,773 | A | 6/1998 | Nishiura ...................... 380/49 |
| 5,828,945 | A | 10/1998 | Klosterman ................. 455/4.2 |
| 5,892,767 | A | 4/1999 | Bell et al. .................... 370/432 |
| 5,917,915 | A | 6/1999 | Hirose .......................... 380/49 |
| 5,923,362 | A | 7/1999 | Klosterman ................. 348/12 |
| 5,987,518 | A | 11/1999 | Gotwald .................... 709/230 |
| 5,987,519 | A | 11/1999 | Peifer et al. ................ 709/230 |
| 6,072,983 | A | 6/2000 | Klosterman ................. 455/4.2 |
| 6,094,671 | A | 7/2000 | Chase et al. ................ 709/201 |
| 6,101,180 | A | 8/2000 | Donahue et al. ............ 370/352 |
| 6,262,982 | B1 | 7/2001 | Donahue et al. ............ 370/352 |
| 6,266,339 | B1 | 7/2001 | Donahue et al. ............ 370/432 |
| 6,385,647 | B1 | 5/2002 | Willis et al. ................ 709/217 |
| 6,401,242 | B1 | 6/2002 | Eyer et al. .................... 725/35 |
| 6,411,607 | B1 * | 6/2002 | Robert et al. ............... 370/316 |
| 6,411,616 | B1 | 6/2002 | Donahue et al. ............ 370/352 |

(Continued)

OTHER PUBLICATIONS

Optibase MGW 3100 Brochure.

(Continued)

*Primary Examiner*—Vivek Srivastava
(74) *Attorney, Agent, or Firm*—Dennis J. M. Donahue, III; Grant D. Kang; Husch & Eppenberger LLC (57) ABSTRACT

A central controller remotely controls and configures sets of receivers to receive programs in a broadcast signal and recast selected sets of programs to selected sets of media devices over a computer network. Each receiver has an input module that receives programs from the broadcast signal, a control module that receives a control stream from the central controller, and a recasting module that reformats and transmits selects programs over the computer network. The receivers use the control stream to configure the selected sets of programs and the selected sets of media devices. The recasting module is uncoupled from the control module so that the receiver's recasting of selected program content can be different for different sets of receivers, thereby allowing any combination of broadcast programs to be recast by any set of receivers to any set of media devices. The receiver also has a storage module and interrupts the live recasting of the broadcast signal to spool out a locally stored file.

27 Claims, 5 Drawing Sheets

U.S. PATENT DOCUMENTS

| | | | |
|---|---|---|---|
| 6,487,721 B1 | 11/2002 | Safadi | 725/36 |
| 6,502,242 B1 * | 12/2002 | Howe et al. | 725/109 |
| 6,810,526 B1 * | 10/2004 | Menard et al. | 725/46 |
| 2001/0003846 A1 | 6/2001 | Rowe et al. | 725/47 |
| 2001/0043573 A1 | 11/2001 | Kelly | 370/316 |
| 2002/0007494 A1 | 1/2002 | Hodge | 725/109 |
| 2002/0010936 A1 | 1/2002 | Adam | 725/91 |
| 2002/0010938 A1 | 1/2002 | Zhang et al. | 725/95 |
| 2002/0026645 A1 | 2/2002 | Son et al. | 725/117 |
| 2002/0034179 A1 | 3/2002 | Ollikainen et al. | 370/389 |
| 2002/0035730 A1 | 3/2002 | Ollikainen et al. | 725/93 |
| 2002/0047899 A1 | 4/2002 | Son et al. | 348/114 |
| 2002/0071434 A1 | 6/2002 | Furukawa | 370/392 |
| 2002/0105976 A1 | 8/2002 | Kelly et al. | 370/519 |
| 2002/0108124 A1 | 8/2002 | Sato | 725/136 |
| 2002/0108128 A1 | 8/2002 | Lash et al. | 725/148 |
| 2002/0131428 A1 | 9/2002 | Pecus et al. | 370/401 |
| 2002/0136218 A1 | 9/2002 | Cardoso, Jr. | 370/394 |
| 2002/0138852 A1 | 9/2002 | Reynolds et al. | 725/136 |
| 2002/0144291 A1 | 10/2002 | Smiley et al. | 725/120 |
| 2002/0150102 A1 | 10/2002 | Janko et al. | 370/392 |
| 2002/0152467 A1 | 10/2002 | Fiallos | 725/50 |
| 2002/0163935 A1 | 11/2002 | Paatela et al. | 370/466 |
| 2002/0184339 A1 | 12/2002 | Mackintosh et al. | 709/218 |
| 2002/0184642 A1 | 12/2002 | Lude et al. | 725/105 |
| 2002/0191640 A1 | 12/2002 | Haymes et al. | 370/466 |
| 2003/0005444 A1 | 1/2003 | Crinon et al. | 725/50 |
| 2003/0009769 A1 | 1/2003 | Hensgen et al. | 725/131 |
| 2003/0012190 A1 | 1/2003 | Kaku et al. | 370/389 |
| 2003/0016664 A1 | 1/2003 | McLampy et al. | 370/389 |

OTHER PUBLICATIONS

Optibase Bridging DVB and IP Networks with Optibase's MGW 3100.

* cited by examiner

| Field # (Size) | Description (Total Size = 188 Bytes) |
|---|---|
| 1 (1 byte) | Sync_Byte |
| 2 (1 bit) | Transport_Error_Indicator |
| 3 (1 bit) | Payload_Unit_Start_Indicator |
| 4 (1 bit) | Transport_Priority |
| 5 (13 bits) | Program Identification Number (PID) |
| 6 (2 bits) | Transport_Scrambling_Control |
| 7 (2 bits) | Adaptation_Field_Control |
| 8 (4 bits) | Continuity_Counter |
| 9 (variable) | Adaptation Field Information (Optional) |
| 10 (remainder) | Video/Audio PES Data |

RECASTING DVB VIDEO SYSTEM TO RECAST DIGITAL BROADCASTS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

This invention relates generally to broadcast networks and, more particularly, a receiver for a broadcast network that is remotely controlled by a central controller and recasts broadcast programs over a computer network.

2. Related Art

Broadcasts over satellites to a satellite receiver, also known as an integrated receiver and decoder (IRD), generally use a classical transmission stream, such as a Digital Video Broadcast (DVB) in which MPEG program stream data are multiplexed together in 188 byte transport stream packets which are identified by particular packet identification (PID) numbers. In traditional broadcast networks, it has been known to remotely control satellite receivers from a central control facility, such as disclosed in U.S. Pat. No. 4,985,895. The current systems also temporarily insert local content over live content and later return to the live content.

Terrestrial digitized video and audio are normally transported over a computer network as a real time stream of data packets. For computer networks, the MPEG program stream data can be packaged into the data packets and transmitted under a multicast address and a port number of the user's choice.

To bridge broadcast networks with computer networks, multi-protocol encapsulators (MPE) were developed which allow the computer network data packets to be transmitted over a DVB satellite feed. An "IP satellite receiver" can then extract the original data packet from the satellite feed and route it to a local area network. Therefore, such an IP satellite receiver merely decodes the satellite transmission and pushes the MPE data onto the computer network. The multicasting addresses are set at the uplink facility and the IP satellite receiver does not have the capability to recombine the same program content with different addresses. Additionally, to provide the programs to computers and other media devices over the computer network, broadcast networks already transmitting programs in the existing classical transmission stream required transmitting additional channels of an MPE formatted stream, even though programs contain identical program content, i.e., the same video and audio but in different formats. It has also been recently disclosed in U.S. Pat. No. 6,385,647 that a multicast scheme can combine a satellite link with local receiving stations that distribute the data by unicasting the data.

However, in bridging satellite networks with computer networks, previous systems have failed to combine the capabilities of remotely controlled receivers with distributed recasting capabilities within the receivers. Accordingly, the previous systems have failed to insert locally stored program content into a live recasting of a broadcast signal. Additionally, the previous systems have failed to control the recasting for the receivers according to different groupings. The systems that merely push MPE data onto the computer network do not even recast the program.

SUMMARY OF THE INVENTION

It is in view of the above problems that the present invention was developed. A central controller remotely controls and configures any set of receivers to recast a set of programs to a set of media devices over a computer network. The programs are transmitted to the receiver in a broadcast signal, and the central controller transmits a control stream to the receiver. In one aspect of the invention, the receiver also interrupts the live recasting of the broadcast signal to spool out a locally stored file. Generally, the present invention uncouples the recasting of program content from the central control of the receivers, allowing any combination of broadcast programs to be recast by any set of receivers to any set of media devices. The control stream is preferably included in a portion of the broadcast signal and includes receiver address information, broadcast service information and recasting information.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
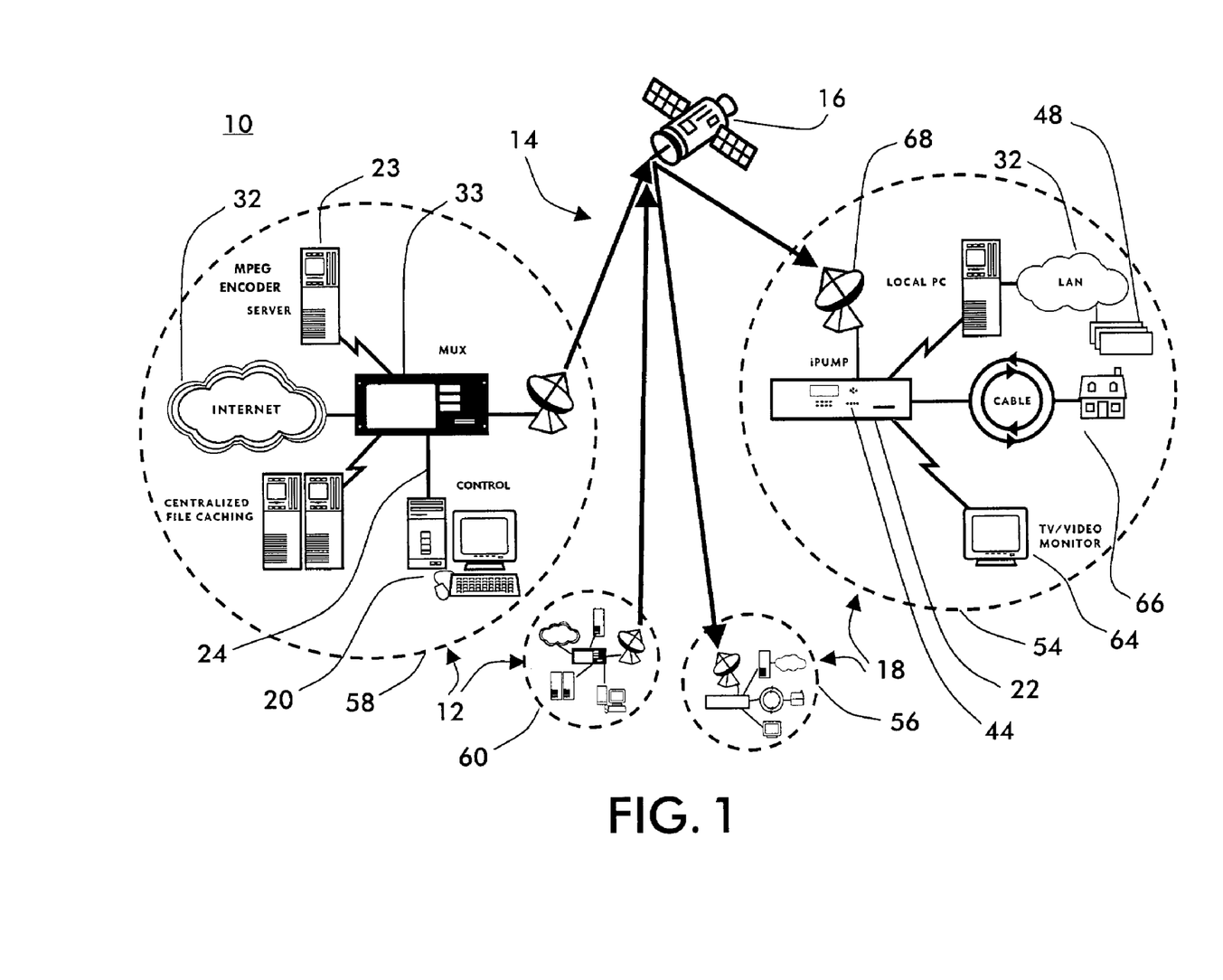
FIG. 1 illustrates a schematic diagram of a broadcast network with the receiver according to the present invention.

Referring to the accompanying drawings in which like reference numbers indicate like elements, FIG. 1 illustrates a broadcast network 10 in which the uplink facilities 12 transmit broadcast signals 14 to a satellite 16. The satellite 16 relays the broadcast signals 14 to the downlink facilities 18. According to the preferred embodiment of the invention, the broadcasts 14 are preferably transmitted in a standard classical media format, such as defined by Digital Video Broadcast (DVB) standards and specifications for the broadcast of MPEG2 transport streams.

A central controller 20 remotely controls each one of the receivers 22 at the downlink facilities 18 by transmitting a control stream 24 to the receivers 22. The control stream 24 contains receiver address information 26, broadcast service information 28 and recasting information 30 that the intended receivers 22 use for their configuration. Such a remote control system preferably incorporates the control stream 24 into a portion of the broadcast signals 14, as disclosed in U.S. Pat. No. 4,985,895 which is hereby incorporated by reference in its entirety. Additionally, it is also possible for the central controller 20 to transmit the control stream 24 to the receiver 22 over a computer network 32, separately from the broadcast signal. Such a computer network 32 can be any combination of computers and other media streaming devices that communicate over the internet. The computers and media devices may be accessed over any combination of local area networks (LAN), wide area networks (WAN), and directly from internet routers.

The broadcasts 16 do not need to waste bandwidth by sending the same program in both the classical format and a multi-protocol encapsulation (MPE) format because, according to an aspect of present invention discussed in detail below, the receiver 22 converts the classical format into a data format that can be transmitted over the computer network 32. Additionally, the remote control and conversion capabilities of the receivers 22 allow for selectively recasting programs over the computer network 32. As discussed in detail below, the receivers 22 can be configured to recast a remotely generated broadcast program and insert local content over the broadcast program. Additionally, the receivers 22 can be configured to splice or switch programs from different input sources and recast the combination of the programs as a single continuous streamed content feed. At the uplink facilities 12, the classical DVB signal can originate from an MPEG encoder 23 which can be multiplexed with the control stream in a multiplexer 33.

Figure 2:
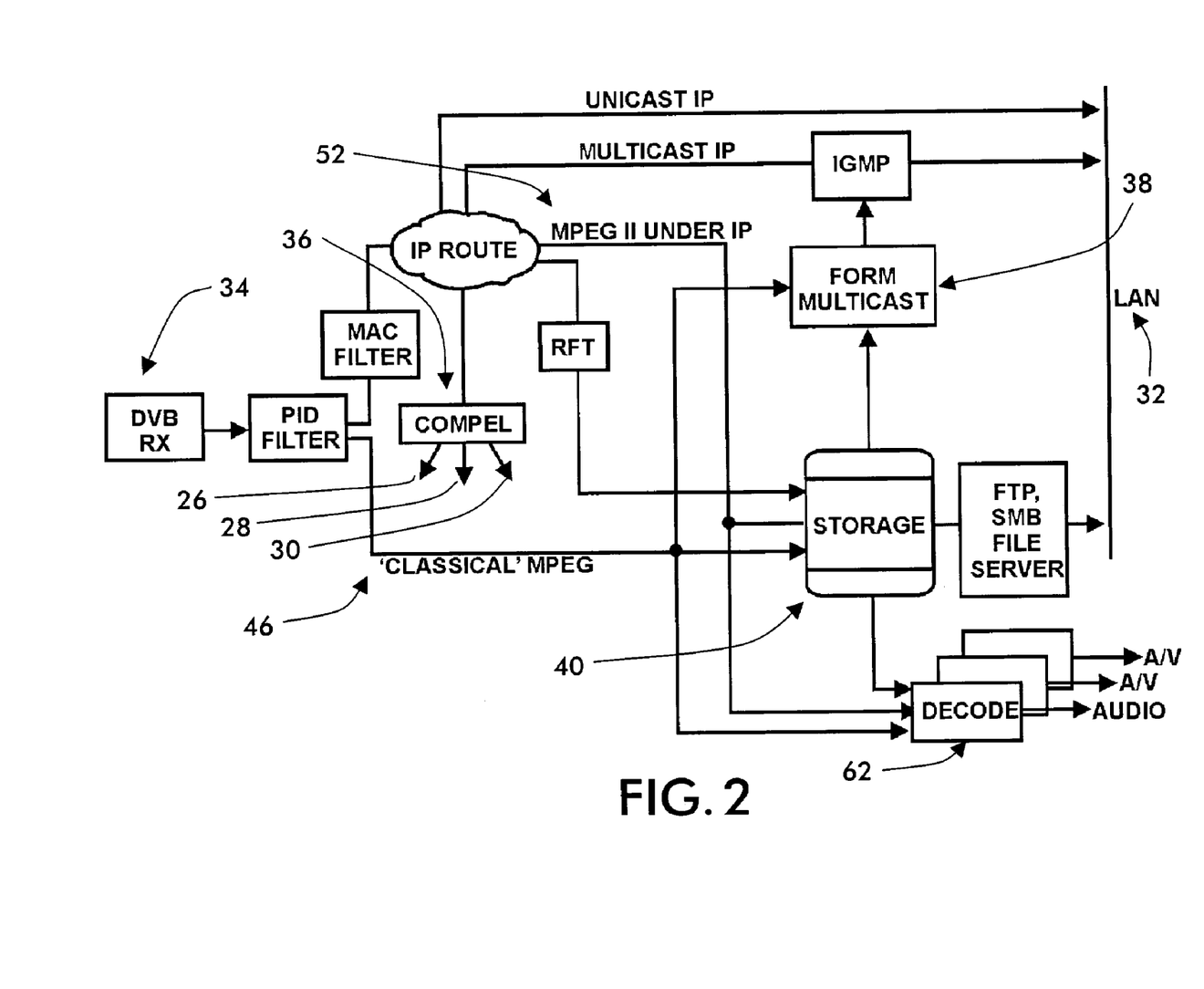
FIG. 2 illustrates a block diagram of the receiver according to the present invention.
Figure 3:
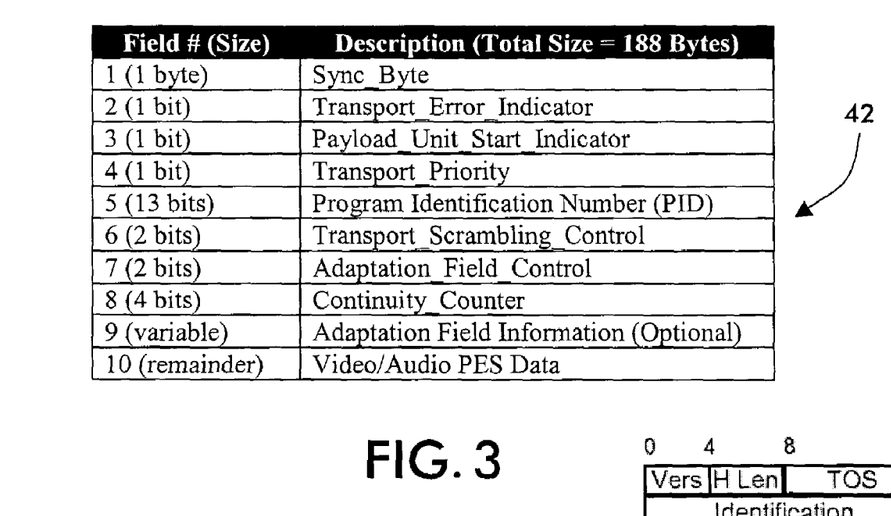
FIG. 3 illustrates a standard format of the broadcast network program packet.
Figure 4:
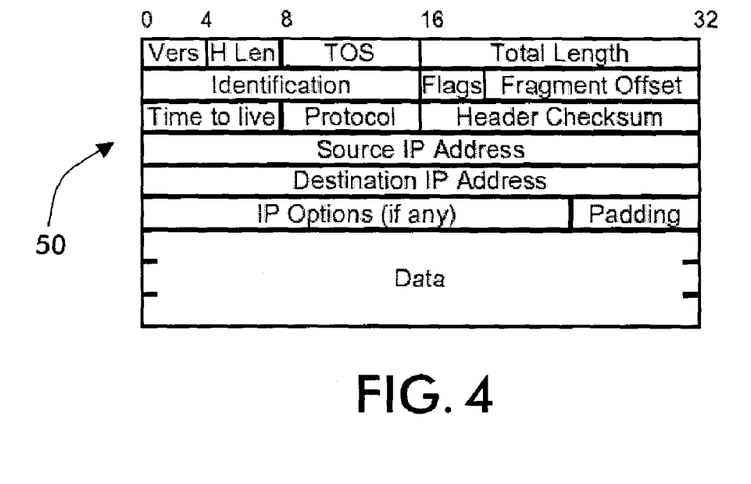
FIG. 4 illustrates a standard format of the computer network data packet, respectively.

The modular layout of the receiver 22 according to the present invention is particularly illustrated in FIG. 2. The receiver 22 has an input module 34 that receives the broadcast signal 14, a remote control module 36 that receives the control stream 24, and a recasting module 38 that converts a selected program contained within the broadcast signal 14 into the data format for the computer network 32. Exemplary formats for packets in the broadcast signal 14 and for the computer network are illustrated in FIGS. 3 and 4, respectively. The receiver 22 also preferably has a storage module 40 that can store a digital media package and also has a non-volatile memory containing program information corresponding with the selected program. As discussed below, the digital media package can be a program that was previously broadcast and saved to the storage module 40 from the broadcast 14. Additionally, the non-volatile memory can be a portion of the storage module 40.

The input module 34 can accept broadcast signals 14 from multiple input sources. For example, the input module 34 can include an input module for broadcast signals 14 that have already been decoded by a satellite receiver, such as DVB-ASI, as well as an RF input module for broadcast signals 14 that have been received by the satellite dish 68 but have not yet been decoded. Additionally, it will be appreciated that other transmission interfaces can also be used for input to the receiver 22. In the preferred embodiment, the input module 34 receives broadcast signals 14 from the satellite 16 through the satellite dish 68 and also has the capability to receive a DVB-ASI input. As illustrated by FIG. 3, the broadcast signals 14 transmit digital media transport packets 42 according to a defined format. Preferably, the packets 42 are formatted according to DVB protocols and standards. The data portion of the packets contains the digital media, preferably audio and/or video in MPEG2 format according to ISO 13818-1.

The remote control module 36 includes control logic for processing the control stream 24. As mentioned above, the control stream 24 is preferably broadcast in a portion of the broadcast signals 14, in which case the receiver 22 extracts the control stream 24 from the broadcast 14 based on a predefined packet identification number (PID) that is programmed and/or stored in the receiver 22 and corresponds with the packets 42 for the control stream 24. It will be appreciated that the packet identification numbers generally identify packets of interest and can be generically referred to as packet identifiers. The control stream 24 contains receiver address information 26 that the receiver 22 uses to determine whether it is an intended receiver of the broadcast 14. As particularly disclosed in U.S. Pat. No. 4,985,895, the receiver 22 with remote control capabilities can be programmed to store the unique receiver address and group address information that is common to several receivers. Therefore, the control stream 24 can be used to control a selected group of receivers, from all receivers that receive the broadcast to a particular set of receivers, including a single intended receiver. The receiver 22 also has a control pad 44 that allows for direct local control. The central controller 24 can disable and enable the control pad 44 through the control stream 24 sent to the receiver 22.

The remote control module 36 also extracts broadcast service information 28 from the control stream 24. The broadcast service information 28 configures the receiver 22 to select the particular packets 42 for at least one program of interest 46 contained within the broadcast signal 14. The selection of the program of interest 46 is made according to PID numbers that correspond with the broadcast service information 28, i.e. filter the program of interest 46 according to the PID number. The broadcast service information 28 includes a program identifier that may directly or indirectly identify the PID number for the program packets 46. When the PID number is indirectly identified, the receiver 22 maps program numbers and descriptors to PID numbers by parsing program specific information tables (PSI). The PSI tables can also be extracted from packets 42 in the incoming broadcast signal 14. In either case, the broadcast service information 28 contains a program identifier that corresponds with the PID numbers of the packets 42 in the broadcast 14 that contain the program of interest 46. The packets for multiple program streams can also be defined by the broadcast service information 28 and selected by the receiver 22. The program identifier is preferably numerical, although other alpha-numeric descriptors could be used, and text labels may be respectively associated with numerical program identifiers. Additionally, the program identifier may actually identify multiple packet identifiers. For example, a given audio-visual program (PROGRAM 3) can be identified by one packet identifier for the audio packets (PID 1001) and another packet identifier for the video packets (PID 1003).

The remote control module 36 also preferably extracts recasting information 30 from the control stream 24. As with the broadcast service information 28, the recasting information 30 can either directly or indirectly identify at least one media device 48 that is connected to the computer network 32. The receiver 22 uses the recasting information 30 to define the destination address(es) for the media devices 48 that will be used by the recasting module 38 in creating the data packets 50 to be sent over the computer network 32 (see FIG. 4). It will be appreciated that there are a number of different protocols can be used in combination with different addresses and means of transmission over the computer network 32. As one example, the data packets 50 that correspond with the selected program 46 may be formatted according to a standard user datagram protocol (UDP) when recasting the data packets 50 on the internet according to the standard internet protocol (IP). Although standard protocols are used in one embodiment of the invention, it will be appreciated that a number of different proprietary protocols can also be used according to the present invention.

The recasting module 38 converts the selected program 46 into the format for the data packets 50 to be transmitted over the computer network 32 and decoded by the media device 48. In the preferred embodiment, the recasting module 38 forms a multicast according to the internet group management protocol (IGMP). However, it should be appreciated that the present invention is not limited to a multicast type of recasting and other recasting methods could be used, such as unicast and broadcast. When multiple types of recasting could be performed by the receiver 22, the recasting information 30 could also include an indication of the protocol that should be used to recast the selected program 46.

The receiver 22 can also process broadcasts which use data in an MPE format, such as DVB-MPE broadcasts containing MPEG2 under IP. For such MPE data 52 contained within the broadcast 14, there is no need to process the data in the recasting module 38. Therefore, the receiver 22 is configured with a list of PID numbers that are to be extracted from the MPEG2 transport stream and treated as MPE data, which is directly pushed onto the computer network 32 according to the IGMP.

Figure 5:
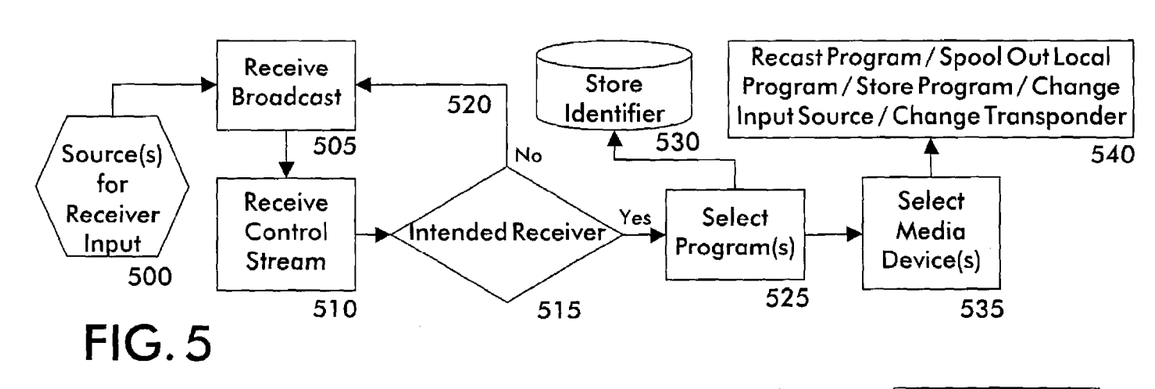
FIG. 5 illustrates a flowchart of the control process.

The general operation and control of the receiver 22 according to the present invention is illustrated in FIG. 5. As discussed above, the receiver can have multiple input sources, such as RF, ASI or some other transmission interface 500. The input module receives the broadcast and de-multiplexes the signal into the transport stream 505. The receiver also receives the control stream 510. The receiver determines whether the address information corresponds with the receiver 515. If the address information does not correspond with the receiver, the receiver continues to receive the broadcast signal and the control signal and continues to check for address information that corresponds with the receiver 520. When the address information corresponds with the receiver, the receiver determine which of the programs in the broadcast signal are selected according to the program identifier(s) 525 and stores the program identifier(s) in the non-volatile memory 530. The receiver determines the addressing and protocols necessary to recast the selected program 535. The receiver also performs any actions that are directed by the control stream, such as recasting the selected program, spooling out a local package, locally storing a program, changing input sources and changing transponders 540.

Figure 6:
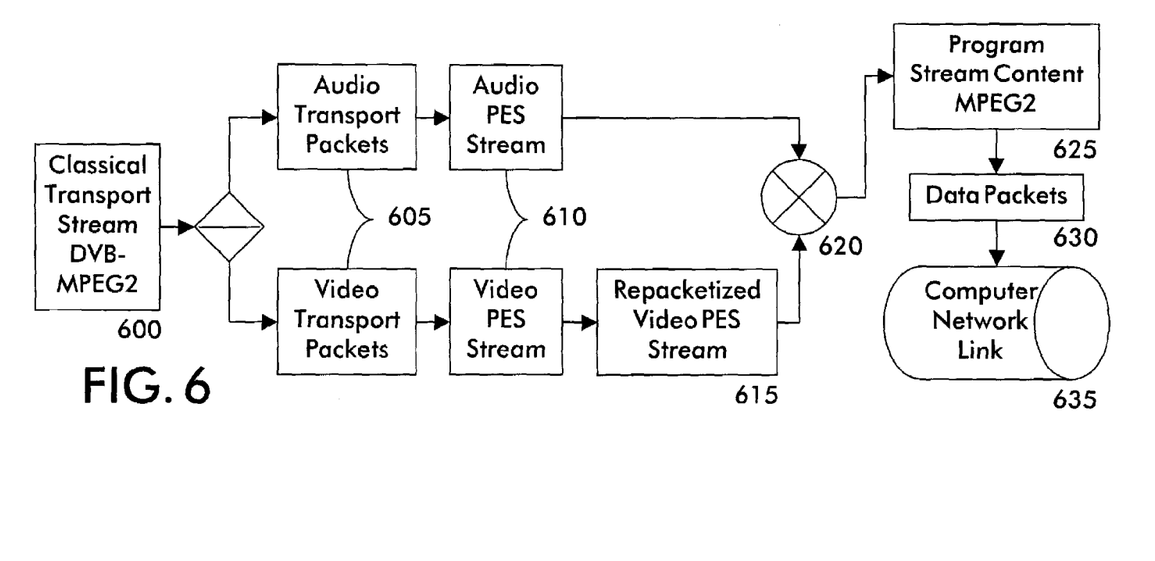
FIG. 6 illustrates a flowchart of the recasting process.

The recasting process according to the present invention is particularly illustrated in FIG. 6. The media transport stream, such as a classical DVB-MPEG2 transport stream, is received from the input module 600. The digital media transport packets, such as the audio and video transport packets, are de-multiplexed from the transport stream 605. The packetized elementary stream (PES) data is extracted from the selected 188 byte transport packets 610. The video PES stream may require repacketizing, as MPEG2 transport stream video PES data may be of unbounded length, whereas program stream content should have video packets of bounded length 615. The length of newly created PES packets is arbitrary but should be less than a maximum allowable length (currently 65,535 bytes). The PES packet data bytes are split at the chosen maximum length and redistributed as needed into new PES packets for the selected source programs, with additional PES packet headers also inserted as needed to create a valid PES.

Audio and video PES streams are re-multiplexed 620, forming a new program stream with the digital media program packets, such as the MPEG2 program packets extracted from the DVB transport stream 625. The receiver generates the headers and additional information for a valid program stream content. Audio and video packets will be interleaved so as to permit smooth reproduction of both audio and video simultaneously by decoders in the downstream media devices. The receiver generates system clock reference (SCR) values as needed either from PCR information contained in the transport stream or from the PTS information in the video/audio PES.

The data packets are generated into which the program stream content is inserted 630. The program stream data is inserted into the 'Data' portion of the data packet, where the number of bytes included in the data payload portion of each data packet will be dependent upon the size of the maximum transfer unit for the particular data link connection over which the computer network data packets are being delivered. As discussed above, the destination address shall be set so as to facilitate unicast, multicast, or broadcast reception of the data packets.

The computer network data packets are transmitted serially across whatever physical link is used to communicate data over the computer network (ethernet, wireless, etc.) 635. The rate of transmission is carefully controlled so as to not flood the network or overflow or underflow the buffers of the receiving clients. Rate control is achieved by monitoring the system clock reference values (SCR) present in the program stream and comparing them with the receiver's local system clock. The local clock is monitored to insure that in the amount of real time which has elapsed the receiver sends out precisely the amount of data which was encoded within that amount of elapsed time. This accomplishes the goal of insuring that the rate of retransmission matches the rate of encoding, and by extension the rate of decoding, so that the receiving clients do not overflow their buffers. To insure the clients do not underflow their buffers, a small portion of the data (an amount of data encoded in a fractional part of a second) is sent out ahead of time, without rate control, which insures receiving clients have enough data to be able to decode continuously without experiencing buffer underflows.

Figure 7:
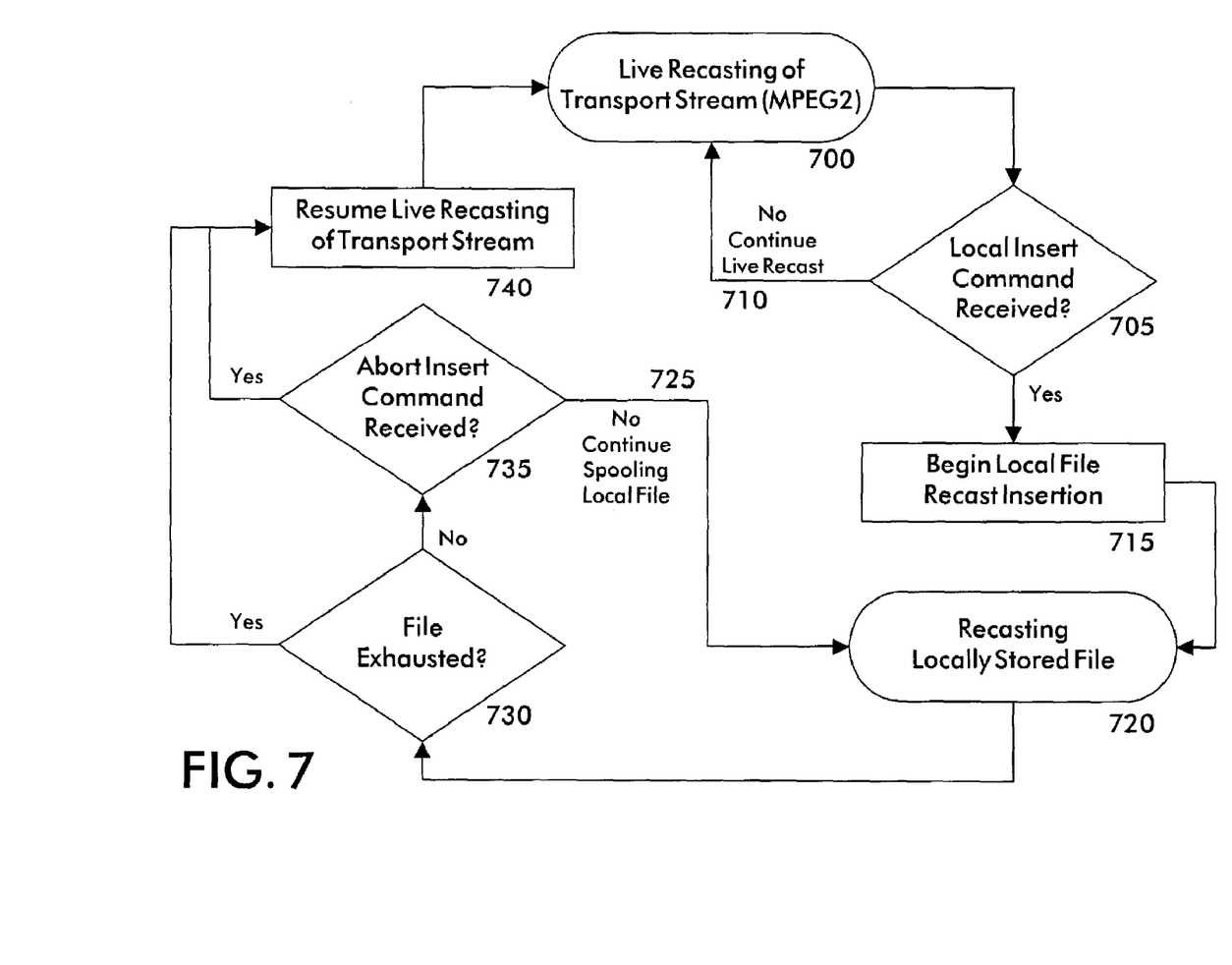
FIG. 7 illustrates a flowchart of the local insertion process.

The local file insertion process according to the present invention is particularly illustrated in FIG. 7. The receiver's initial state of operation is assumed to be that of recasting the transport stream corresponding to the selected program while the selected source program is being broadcast and the receiver is continuing to receive the broadcast signal 700. Such "live" recasting of the broadcast is illustrated in FIG. 6 and described in detail above. As discussed above, the receiver stores the specifications for accessing the source program in a non-volatile manner, allowing the receiver to return to the source program after spooling out the local source content. In this manner, the live recasting of the source program can be interrupted with the locally stored digital media package. The specifications contain the program information corresponding with the selected program, including the program identifiers discussed above as well as other program service information. It will be appreciated that while the receivers are recasting the locally stored digital media package, they could continue to receive any continuing broadcast and could store such portion of the broadcast in the local memory or dump it.

The receiver monitors the control stream and checks for a local insert command 705 and if no local insert command is received, the receiver continues the live recasting of the source program 710. When received, the local insert command directs the receiver to insert the locally stored digital media package 715. The local insert command can be sent in the control stream or locally entered at the receiver. As discussed above, in the preferred embodiment, the receiver extracts the control stream from a portion of the broadcast signals although the control stream can also be transmitted over the computer network.

The receiver discontinues the live recasting of the selected source program and begins inserting the source material from the locally stored file into the computer network data packets 720. The local files are preferably stored as a digital media package that is in or convertible to a format which is comparable to the format to which the broadcast program is translated before it is inserted into the computer network data packets, i.e., the digital media program packets. Accordingly, the digital media package can be read out from the local storage device and inserted into the computer network data packets in a manner similar to the digital media program packets as discussed in the recasting process above. The insertion of the local content appears as a continuous program stream, without any perceived interruption or redirection to the end user accessing the media device, because there is no alteration to the data packet source/destination headers when the recasting stream is generated and only the source for the content in the data portion of the packet is changed.

The transmission of the local content continues 725 until the file is exhausted 730 or a command is received to abort the local file insertion process 735. The receiver discontinues inserting the local file content into the data packets, and resumes the live recasting of the source program according to the stored specifications with the program identifiers that is read from the non-volatile memory (and which may be a portion of the storage module) 740.

As discussed above, the locally stored digital media package can be a program that had been previously broadcast and stored on the receiver's 22 storage module 40. Accordingly, to store a broadcast program, the central controller 20 could transmit the control stream 24 directing the receiver 22 to store one of the programs in the broadcast signal 14. Additionally, using the remote control addressing capabilities of the receivers 22, the central controller 20 could selectively control different receivers to store different programs. All of these programs can be sent in the same broadcast signal 14 that also transmits the control stream 24, and each individual receiver 22 would only store the programs as directed by the central controller 20. In this manner, the receivers 22 can be loaded with packages that can localize the recast program with regional content and individual content. For example, local advertisements could be spooled out in the local file insertion process, such as a snow tire commercial for receivers 22 in one regional grouping 54 and a rain tire commercial for receivers 22 in another regional grouping 56. It will be appreciated that multiple regions and service areas can be defined and served by different groupings of the receivers 22 according to their remote control addressing capabilities, and multiple receivers 22 can also serve a single geographic region.

As discussed above, the central controller 20 could also direct selected groups of receivers 22 to change their input sources and other broadcast service information, such as the program identifier and even the transponder. Such a change in the broadcast service information 28 reconfigures the receivers 22 to splice or switch between source programs. Similar to the local file insertion process, the receivers 22 combine and recast the source programs as a single continuous streamed content feed. It will be appreciated that the receivers 22 may also simultaneously process programs from multiple input sources, including data entering the receiver from different input modules and different transponders on the broadcast satellite 16. Given the remote control and recasting capabilities of the receivers 22, a company may use one or more receivers 22 for a live recasting of a broadcast 14 from multiple feed locations 58, 60 to employees in one or more office locations 54, 56. For example, during the broadcast 14 and live recasting from one feed location 58 (such as New York), the central controller 22 could direct the receivers 22 to switch transponders to a new source program that is being uplinked to the satellite 16 from a different feed location 60 (such as Los Angeles). Additionally, the receiver 22 has a standard decoding module 62 that can serve a local media device, such a television/video monitor 64, which may be connected to the receiver 22 through a cable network 66.

The combination of the control module 36 and the recasting module 38 in each receiver 22 allows the present invention to decentralize the recasting process while retaining a centralized control 20 over each one of the receivers 22. In this manner, the broadcast can be sent with programs in the standard classical format without duplicating content in a different format, and sets of receivers 22 can be grouped and centrally controlled to recast the selected program over the computer network in different ways and to different groups. With the incorporation of the storage module 40, the receiver 22 can also spool out local content according to each region controlled by the central controller 20 and served by identified receivers 22. Therefore, by uncoupling the recasting of program content from the central control of the receivers 22, the present invention allows multiple receivers 22 to receive the same broadcast signal 14 and recast different programs, recast the same program with different local input to different groups of media devices, recast one program, and switch to another program—as well as any other combination of program content to be recast to the media devices 48 according to the control stream 24.

Generally, any combination of broadcast programs to be recast by any set of receivers to any set of media devices because the control stream 24 configures the receivers 22 according to set theory using the receiver address information 26, broadcast service information 28 and recasting information 30. In particular, the control commands use boolean operators (logical AND, OR, and NOT), allowing for extremely fine targeting of the control commands. Therefore, any combination of broadcast programs can be selected and recast by any set of selected receivers to any set of selected media devices according to the broadcast service information 28, the receiver address information 26, and the recasting information 30, respectively.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the central controller 20 can command the receivers 22 to perform actions simultaneously or sequentially and can direct the timing for such actions, such as the recasting programs, storing files, spooling out local files, and switching programs, input sources and transponders. Thus, the breadth and scope of the present invention should not be limited by any of the above-described exemplary embodiments, but should be defined only in accordance with the following claims appended hereto and their equivalents.

What is claimed is:

1. A method for selectively recasting a program over a computer network, comprising the steps of:
   storing a digital media package on a local storage device;
   receiving and de-multiplexing a media transport stream from a broadcast signal, said media transport stream containing a source program in a plurality of digital media program packets;
   recasting said digital media program packets as a plurality of computer network data packets over the computer network while continuing to receive said source program from said broadcast signal;
   monitoring a control signal for a local insert command;
   interrupting said recasting step and transmitting said stored digital media package over the computer network in response to said local insert command while continuing to receive said source program from said broadcast signal; and
   returning to said recasting step;
   wherein said receiving and de-multiplexing step is further comprised of:
   reading from said local storage device a stored specification for said source program; receiving a broadcast signal of a transport stream, said transport stream containing packetized stream data with a plurality of packet identifiers respectively corresponding to a plurality of programs;
   de-multiplexing said packetized stream data for said plurality of programs;
   selecting and extracting said source program packets from said plurality of programs according to each of said packet identifiers that correspond with said stored specification.

2. The method according to claim 1, wherein said monitoring step further comprises the step of receiving said control signal through said computer network.

3. The method according to claim 1, wherein said recasting step comprises the steps of:
   extracting said digital media program packets from said media transport stream;
   forming a program stream with said digital media program packets;
   generating a plurality of computer network data packets, wherein each one of said computer network data packets has a data payload size;
   dividing and inserting said program stream into said computer network data packets according to said data payload size;
   transmitting said computer network data packets over the computer network;
   creating and monitoring system clock references in said program stream;
   comparing said system clock references with an elapsed real time according to a local system clock;
   controlling a rate of transmission according to said system clock references and said elapsed real time; and
   selecting a portion of said program stream corresponding with a fraction of said elapsed real time and transmitting said portion in said computer network data packets without any rate control.

4. The method according to claim 1, wherein said interrupting step further comprises the steps of:
   receiving said local insert command;
   reading said digital media package from said local storage device;
   generating a plurality of computer network data packets;
   dividing and inserting said stored digital media package into said computer network data packets;
   transmitting said computer network data packets over the computer network;
   monitoring a file control signal for a stop interruption signal, wherein said stop interruption signal is selected from the group consisting of an end of file signal and an abort local insertion signal; and
   reading from said local storage device a stored specification for said source program.

5. The method according to claim 1, further comprising the steps of selectively decoding said digital media program packets and providing said decoded digital media program packets to a media device via a cable network, and wherein said monitoring step further comprises the step of extracting said control signal from at least one of said broadcast signal and said computer network.

6. The method according to claim 1, further comprising the steps of:
   defining address information corresponding with at least one satellite receiver, said satellite receiver comprising a storage module, a broadcast input module, a recasting module and a remote control module for respectively performing said storing, receiving, recasting and monitoring steps;
   receiving a control stream containing receiver address information, broadcast service information and recasting information; and
   configuring said satellite receiver according to said broadcast service information and said recasting information when said satellite receiver is identified by said receiver address information, wherein said broadcast service information defines said source program and said recasting information defines at least one media player accessible through the computer network.

7. A method for selectively recasting a program over a computer network, comprising the steps of:
   storing a digital media package on a local storage device;
   receiving and de-multiplexing a media transport stream from a broadcast signal; said media transport stream containing a source program in a plurality of digital media program packets;
   recasting said digital media program packets as a plurality of computer network data packets over the computer network while continuing to receive said source program from said broadcast signal;
   monitoring a control signal for a local inset command;
   interrupting said recasting step and transmitting said stored digital media package over the computer network in response to said local insert command; wherein said interruption and recasting step is further comprised of:
   (a) receiving said local insert command;
   (b) reading said digital media package from said local storage device;
   (c) generating a plurality of computer network data packets;
   (d) dividing and inserting said stored digital media package into said computer network data packets; and (e) transmitting said computer network data packets over the computer network;

monitoring a file control signal for a stop interruption signal, wherein said stop interruption signal is selected from the group consisting of an end of file signal and an abort local insertion signal;

reading from said local storage device a stored specification for said source program; and returning to said recasting step.

8. A method for selectively recasting a program over a computer network, comprising the steps of:

storing a digital media package on a local storage device;

receiving and de-multiplexing a media transport stream from a broadcast signal; said media transport stream containing a source program in a plurality of digital media program packets;

recasting said digital media program packets as a plurality of computer network data packets over the computer network while continuing to receive said source program from said broadcast signal;

monitoring a control signal for a local insert command;

interrupting said recasting step and transmitting said stored digital media package over the computer network in response to said local insert command;

returning to said recasting step;

defining address information corresponding with at least one satellite receiver, said satellite receiver comprising a storage module, a broadcast input module, a recasting module and a remote control module for respectively performing said storing, receiving, recasting and monitoring steps;

receiving a control stream containing receiver address information, broadcast service information and recasting information; and configuring said satellite receiver according to said broadcast service information and said recasting information when said satellite receiver is identified by said receiver address information, wherein said broadcast service information defines said source program and said recasting information defines at least one media player accessible through the computer network.

9. The method according to claim 8, further comprising the steps of:

defining unique address information for a plurality of satellite receivers;

receiving a control stream containing receiver address information, broadcast service information and recasting information for said plurality of satellite receivers;

configuring said plurality of satellite receivers according to said broadcast service information and said recasting information.

10. The method according to claim 8, further comprising the steps of:

storing a specification for said source program in a non-volatile memory according to a source program identifier contained in said broadcast service information;

receiving a store command to store a new source program on said local storage device; and storing new digital media program packets for said new source program as a new digital media package.

11. The method according to claim 8, further comprising the step of switching to a new source program while receiving said broadcast signal and sequentially recasting said new source program with said source program as a single continuous streamed content feed of said source program and said new source program.

12. The method according to claim 11, further comprising the steps of:

extracting said control stream from said broadcast signal;

monitoring said control stream for a change in broadcast service information to said new source program, wherein said change is selected from the control group consisting of a new source program identifier, a new transponder identifier, and a new input identifier; and reconfiguring said receiving and de-multiplexing step according to said change in broadcast service information, wherein said digital media program packets are received for said new source program and recasted as said computer network data packets in said single continuous streamed content feed.

13. A method for selectively recasting a program over a computer network according to a central controller, comprising the steps of:

defining a receiver address corresponding with at least one broadcast receiver, said broadcast receiver comprising an input module in communication with a broadcast device, a remote control module in communication with the central controller, and a recasting module in communication with the computer network;

receiving a control stream identifying said receiver address and containing broadcast service information and recasting information, wherein said remote control module determines whether said control stream identifies its broadcast receiver and wherein said broadcast service information corresponds with a source program of interest and said recasting information corresponds with at least one media player accessible through the computer network;

configuring said identified broadcast receiver according to said broadcast service information and said recasting information;

receiving and de-multiplexing a media transport stream from a broadcast signal; said media transport stream containing said source program in a plurality of digital media program packets and being received by said identified broadcast receiver through said input module; and recasting said digital media program packets as a plurality of computer network data packets over the computer network, said recasting module performing said recasting step while said input module continues to receive said source program from said broadcast signal.

14. The method according to claim 13, wherein said configuring step further comprises the step of extracting said control stream from a broadcast signal of a DVB transport stream from a satellite.

15. The method according to claim 13, further comprising the steps of:

defining unique address information for a plurality of satellite receivers;

receiving a control stream containing receiver address information, broadcast service information and recasting information for said plurality of satellite receivers;

configuring said plurality of satellite receivers according to said broadcast service information and said recasting information.

16. The method according to claim 13, further comprising the steps of:

storing a digital media package on a storage module, said storage module being contained within said identified broadcast receiver and being controllable by said control stream;

storing a specification for said source program in a non-volatile memory according to a source program identifier contained in said broadcast service information;

extracting said control stream from said broadcast signal;

monitoring said control stream for a local insert command;

interrupting said recasting step and transmitting said stored digital media package over the computer network in response to said local insert command; and returning to said recasting step.

17. The method according to claim 16, further comprising the steps of:

storing address information for said broadcast receiver on said storage module, wherein said address information comprises said receiver address and a group address, wherein said receiver address is unique to said broadcast receiver and said group address is shared in common with a plurality of satellite receivers;

reading said stored specification from said local storage device;

receiving a broadcast signal of a DVB transport stream from a satellite, said DVB transport stream containing packetized stream data with a plurality of packet identifiers respectively corresponding to a plurality of programs;

de-multiplexing said packetized stream data for said plurality of programs;

selecting said source program from said plurality of programs according to each of said packet identifiers that correspond with said stored specification.

18. The method according to claim 17, further comprising the step of switching to a new source program while receiving said broadcast signal and sequentially recasting said new source program with said source program as a single continuous streamed content feed of said source program and said new source program.

19. The method according to claim 18, further comprising the steps of:

monitoring said control stream for a change in broadcast service information to said new source program, wherein said change is selected from the control group consisting of a new source program identifier, a new transponder identifier, and a new input identifier; and reconfiguring said identified broadcast receiver according to said broadcast service information, wherein said digital media program packets are received for said new source program and recasted as said computer network data packets in said single continuous streamed content feed.

20. A method for receiving a program broadcast over a satellite and selectively recasting the program over a computer network according to a central controller, comprising the steps of:

defining a receiver address corresponding with at least one satellite receiver, said satellite receiver comprising an input module in communication with the satellite, a remote control module in communication with the central controller, a recasting module in communication with the computer network and in operative relationship with said remote control module, and a storage module in communication with said recasting module and in operative relationship with said remote control module;

receiving a broadcast signal of a DVB transport stream from the satellite through said input module, said DVB transport stream comprising packetized stream data with a plurality of packet identifiers respectively corresponding to a plurality of media programs and a control steam, wherein a predefined control packet identifier corresponds with said control stream and each one of said media programs is broadcast in a plurality of digital media program packets;

de-multiplexing said packetized stream data for said plurality of programs and said control stream and selecting said control stream according to said predefined control packet identifier, wherein said control stream comprises receiver address information, broadcast service information and recasting information, and wherein said receiver address information corresponds with said satellite receiver and said broadcast service information corresponds with a source program of interest and said recasting information corresponds with at least one media player accessible through the computer network;

forwarding said control stream to said remote control module and extracting a program identifier from said broadcast service information, wherein said program identifier corresponds with said source program;

storing a specification for said source program in a non-volatile memory according to said program identifier;

storing a digital media package on said storage module;

selecting said digital media program packets for said source program from said plurality of programs according to each of said packet identifiers that correspond with said program identifier and said stored specification;

recasting said digital media program packets for said source program as a plurality of computer network data packets over the computer network, said recasting module performing said recasting step while said input module continues to receive said source program from said broadcast signal;

monitoring a control signal for a local insert command;

interrupting said recasting step and transmitting said stored digital media package over the computer network in response to said local insert command; and returning to said recasting step.

21. The method according to claim 20, further comprising the step of storing receiver address information on said storage module, wherein said receiver address information comprises said receiver address and a group address, wherein said receiver address is unique to said satellite receiver and said group address is shared in common with a plurality of satellite receivers.

22. The method according to claim 20, further comprising the steps of:

receiving in said control stream a store command to store a new source program on said storage module; and storing new digital media program packets corresponding with said new source program as a new digital media package on said storage module.

23. A remote controlled system for receiving a broadcast from a satellite and selectively recasting the broadcast over a computer network, comprising:

a central controller producing a control stream with receiver address information, broadcast service information and recasting information; and a satellite receiver comprising an input module, a remote control module and a recasting module, wherein said input module receives the broadcast from the satellite, said remote control module receives said control stream from said central controller, and said recasting module recasts a selected source program from the broadcast to at least one media device connected to the computer network, and wherein said satellite receiver further comprises control logic for processing said control stream and correlating said satellite receiver, said selected source program and said media device with said receiver address information, said broadcast service information and said recasting information, respectively.

24. The remote controlled system according to claim 23, wherein said satellite receiver further comprises:
   a storage module containing a digital media package;
   a non-volatile memory containing program information corresponding with said selected program; and
   wherein said satellite receiver further comprises spot insertion logic for replacing a portion of said selected source program with said digital media package and returning to said selected source program according to said program information in said non-volatile memory.

25. The remote controlled system according to claim 23, wherein said satellite receiver further comprises source control logic to switch between a plurality of source programs according to a change in broadcast service information, wherein said change is selected from the control group consisting of a new source program identifier, a new transponder identifier, and a new input identifier.

26. The remote controlled system according to claim 23, further comprising:
   a communication route for said control stream between said central controller and said satellite receiver, wherein said transmission route is selected from the group consisting of a portion of the broadcast over the satellite and a connection via the computer network.

27. The remote controlled system according to claim 23, further comprising:
   a second satellite receiver comprising a second input module, a second remote control module and a second recasting module, wherein said second input module receives the broadcast from the satellite, said second remote control module receives said control stream from said central controller, and said second recasting module recasts said selected source program from the broadcast to a different media device connected to the computer network, and wherein said second satellite receiver further comprises control logic for processing said control stream and correlating said second satellite receiver, said selected source program and said different media device with said receiver address information said broadcast service information, and said recasting information, respectively.

* * * * *

UNITED STATES PATENT AND TRADEMARK OFFICE
CERTIFICATE OF CORRECTION

PATENT NO. : 7,032,235 B2  Page 1 of 1
APPLICATION NO. : 10/387976
DATED : April 18, 2006
INVENTOR(S) : Pelkey et al.

It is certified that error appears in the above-identified patent and that said Letters Patent is hereby corrected as shown below:

| Column/Line No. | Reads | Should Read |
|---|---|---|
| Col. 10, line 54 | "for a local inset command:" | --for a local insert command:-- |
| Col. 14, line 3 | "control steam, wherein a " | --control stream, wherein a -- |

Signed and Sealed this

Eighth Day of August, 2006

JON W. DUDAS
*Director of the United States Patent and Trademark Office*